United States Patent
Williams et al.

[11] Patent Number: 5,944,182
[45] Date of Patent: Aug. 31, 1999

[54] CASE FOR PACKAGING AND STORING A MAGNETIC DISK CARTRIDGE

[75] Inventors: Kristi Williams, Santa Clara; Shaun Salisbury, Alameda, both of Calif.

[73] Assignee: Iomega Corporation, Roy, Utah

[21] Appl. No.: 08/874,772

[22] Filed: Jun. 13, 1997

[51] Int. Cl.$^6$ .............................. G11B 5/00; B65D 85/57
[52] U.S. Cl. ...................................... 206/308.3; 206/309
[58] Field of Search ............................ 206/308.1, 308.3, 206/307, 309–312, 493; 346/137

[56] References Cited

U.S. PATENT DOCUMENTS

| | | |
|---|---|---|
| D. 363,926 | 11/1995 | Iftikar et al. . |
| D. 366,037 | 1/1996 | Kawauchi et al. . |
| D. 375,728 | 11/1996 | Nicklos et al. . |
| D. 378,518 | 3/1997 | Sumner et al. . |
| 3,951,264 | 4/1976 | Heidecker et al. ................... 206/308.3 |
| 4,463,850 | 8/1984 | Gorog ................................... 206/308.3 |
| 4,627,531 | 12/1986 | Clemens . |
| 4,771,883 | 9/1988 | Herr et al. . |
| 4,881,640 | 11/1989 | Herr et al. . |
| 4,899,875 | 2/1990 | Herr et al. . |
| 4,993,552 | 2/1991 | Bugbey et al. . |
| 5,150,354 | 9/1992 | Iwata et al. . |
| 5,188,230 | 2/1993 | O'Brien et al. . |
| 5,205,405 | 4/1993 | O'Brien et al. . |
| 5,253,751 | 10/1993 | Wipper . |
| 5,385,235 | 1/1995 | Ikebe et al. ........................... 206/308.3 |
| 5,417,323 | 5/1995 | Presnick . |
| 5,445,265 | 8/1995 | Herr et al. ............................. 206/308.3 |
| 5,462,158 | 10/1995 | Kramer . |
| 5,515,967 | 5/1996 | Fitzsimmons et al. . |
| 5,531,324 | 7/1996 | Kosaki et al. . |
| 5,709,300 | 1/1998 | Bolognia et al. .................... 206/308.1 |
| 5,730,283 | 3/1998 | Lax ....................................... 206/308.1 |
| 5,746,314 | 5/1998 | Knutsen et al. ..................... 206/308.1 |

FOREIGN PATENT DOCUMENTS 0 502 572 A1  9/1992  European Pat. Off. .
0 632 454 A1  1/1995  European Pat. Off. .

OTHER PUBLICATIONS

Laserfile, Inc., "Laserfile® CD, CD–ROM, and CD–R Packaging", 1996, 10 pages.

*Primary Examiner*—Paul T. Sewell
*Assistant Examiner*—Luan K. Bui
*Attorney, Agent, or Firm*—Woodcock Washburn Kurtz Mackiewicz & Norris LLP

[57] ABSTRACT

A case for packaging and storing a magnetic disk cartridge is disclosed. The case includes a tray that slides into a housing, and a seal between the tray and the housing. The seal protects the cartridge from dust and contaminant infiltration and from physical damage. The tray forms a receptacle for receiving and holding the cartridge and includes a hinge for enabling a front portion of the tray to pivot downward to provide clearance to insert and remove the cartridge by sliding therein. The case includes a latching means for latching the tray and housing together, a transparent panel for viewing the cartridge while it is inside of the case, a clasp that prevents the tray from being fully removed from the housing, and unique key members that mate to corresponding key grooves in a JAZ cartridge.

18 Claims, 6 Drawing Sheets

FIG. 7
Prior Art

CASE FOR PACKAGING AND STORING A MAGNETIC DISK CARTRIDGE

FIELD OF THE INVENTION

This invention relates to handling small items, and more particularly, relates to packaging and storing a magnetic disk cartridge.

BACKGROUND OF THE INVENTION

Disk cartridges for information storage typically comprise one or more disks that are housed in a hard plastic shell. The disks have a hub located near the disk center, and the shell has an aperture that provides access for a disk drive spindle motor to engage the disk hub. The cartridge typically also has a head opening for enabling a read/write head to access information stored on the disk. The head opening is typically covered by a moveable closure, such as, for example, a spring load shutter or a sliding flexible door member.

Advances in disk and disk drive technology have provided disk cartridges with increasing speed and data storage capacity. Along with increased speed and capacity, such cartridges often have greater probability for dust and gaseous chemical contamination of the disk media, and have high cost. Moreover, the information that is stored on such cartridges often has value worth many times the price of the cartridge. Future advances will likely increase the cartridge value.

Figure 7:
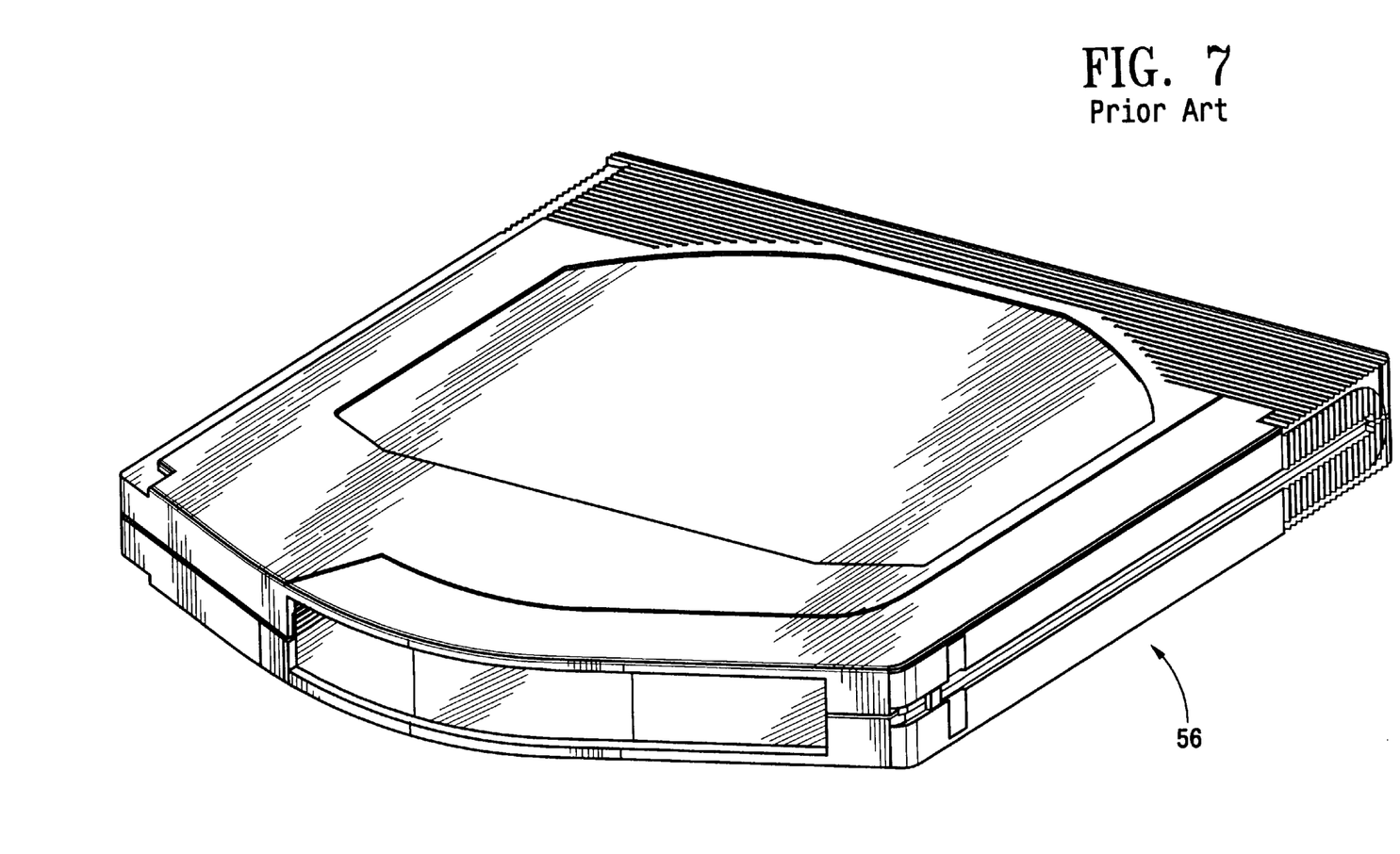
FIG. 7 is a view of a conventional cartridge of the type that may be employed by the case of FIG. 1.

FIG. 7 (Prior Art) shows a JAZ cartridge 56, which illustrates such advantages and features. The JAZ cartridge, which is produced by the assignee of the present invention, is described in U.S. Pat. Des. No. 378,518 (Summer et al.) and is incorporated herein by reference in its entirety. Cartridge 56 has a substantially perpendicular box shape, except for its access end (that is, the end having the flexible door) that has a partly rectilinear and partly arcuate shape. Cartridge 56 houses a disk (not shown) for storing magnetic information.

Dust infiltration into a cartridge may interrupt or corrupt the information stored on the disk. Physical damage may break the shell or cause the stored information to become unrecoverable. Such damage may occur during shipping, handling, or storage of the cartridge.

It is therefore desirable to provide a device that protects a disk cartridge from physical damage and from dust infiltration, and that is easy to use.

SUMMARY OF THE INVENTION

A case for holding a magnetic disk cartridge is provided. The case may be employed for packaging the cartridge before the cartridge is sold to an end user. Alternatively, the case may be supplied separately from the cartridge. Regardless of the means by which a user acquires it, the case protects the cartridge from physical damage and augments protection against dust and gaseous chemical infiltration while the cartridge is disposed therein.

The case according to the present invention comprises a housing, a tray, and a seal. The tray has a bottom planar member, a front panel, two side walls, a curved rear wall, and front tabs and rear tabs that extend from the side walls. The side walls, tabs, and bottom member form a receptacle, into which a disk cartridge may slide. Rectangular key members protrude from the top and bottom corners of one side of the tray into the receptacle. The top key member has different dimensions from the bottom key member, each of which mate to corresponding square notches on the corners of the disk cartridge, which are described in U.S. patent application Ser. No. 08752823, filed Nov. 20, 1996, which is incorporated herein by reference in its entirety. The key members assure proper orientation of the cartridge during insertion into the tray, and enhance the tightness of fit between the tray and the cartridge.

The tray also has a hinge that separates a tray front portion from a tray rear portion. The tray is capable of sliding into and out of an opening in a front of the housing. If the tray is translated out of the housing opening far enough to expose the hinge, the tray front portion may be pivoted downward, which enables the disk cartridge to slide into or out of the receptacle.

The seal is located on a front portion of the tray just inside of the tray front panel. The front panel and the seal substantially obstruct the housing opening while the tray is in the fully inserted position. Because the disk cartridge is fully enclosed by the case while the tray is fully inserted in the housing, the case protects the disk cartridge from physical damage as well as from dust and chemical contaminant infiltration.

The case also includes latching means for holding the tray within the housing while in the fully inserted position, a gripping surface that is used to unlock the latching means, and a clasp that limits the outward travel of the tray relative to the housing.

DESCRIPTION OF THE PREFERRED EMBODIMENT

Referring generally to the Figures, wherein the reference numerals are used consistently throughout the views, there is shown a case for packaging and storing a magnetic disk cartridge according to the preferred embodiment of the present invention. Although a case 10 according to the present invention is described having a shape that corresponds to a conventional cartridge 56, the present invention is not limited thereto. The present invention, rather, encompasses a case 10 that is formed to receive any magnetic disk cartridge, including a conventional JAZ cartridge shape, a cartridge that is of similar shape and size to the conventional JAZ cartridge shape, and a cartridge that is of dissimilar shape and size to the conventional JAZ cartridge shape.

Figure 1:
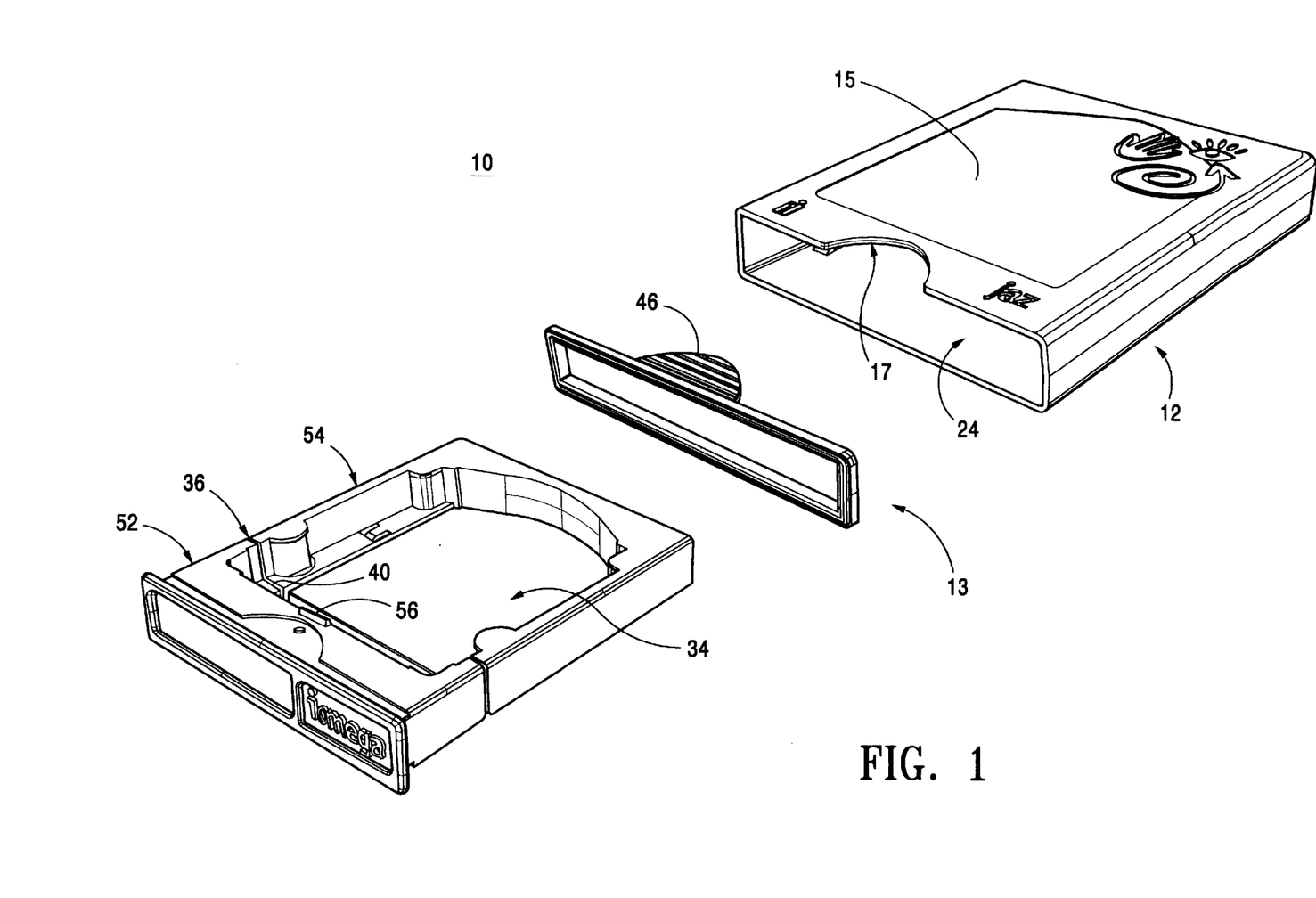
FIG. 1 is a perspective, exploded view of the case according to the resent invention showing the tray, seal, and housing.
Figure 2:
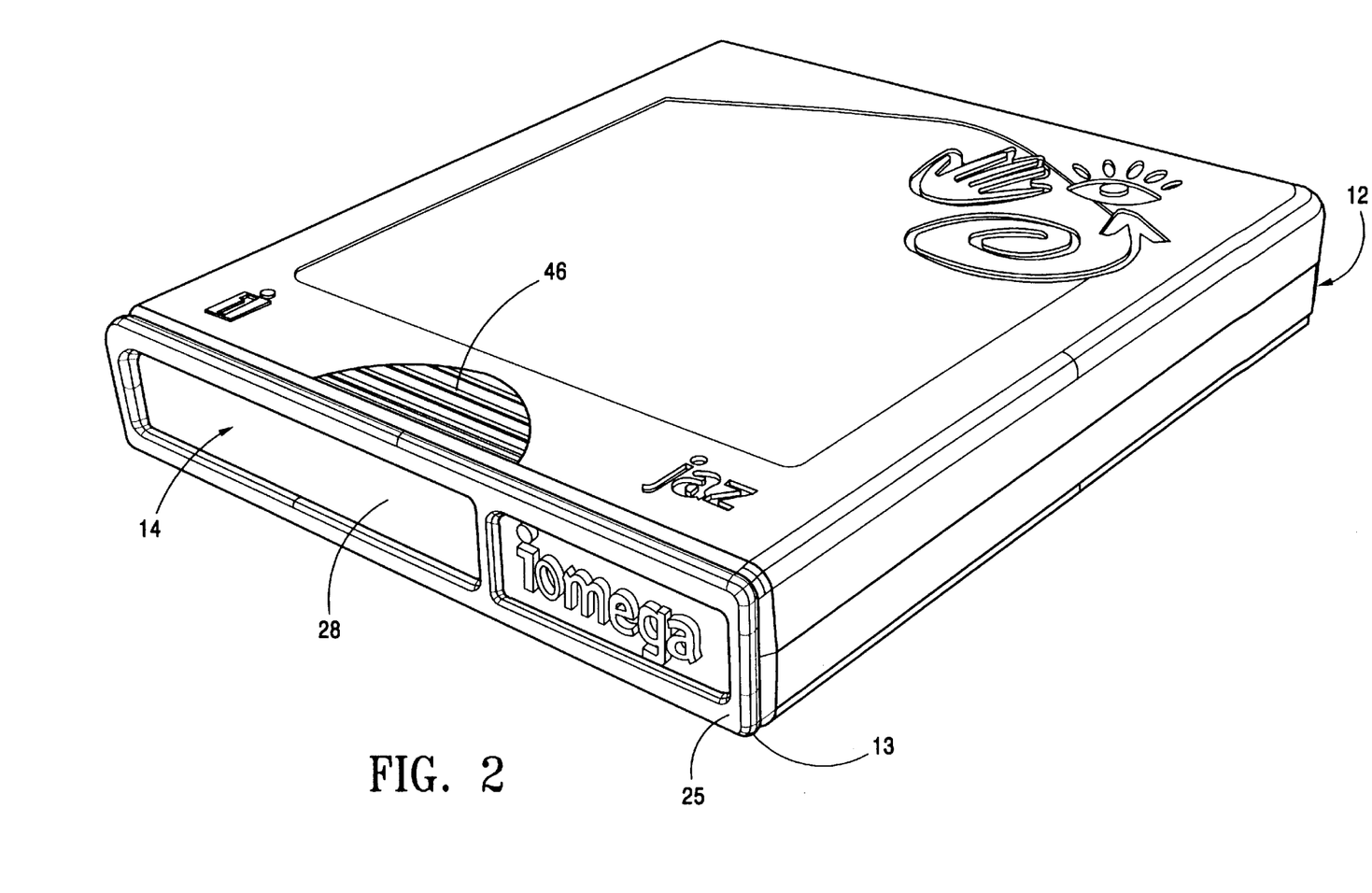
FIG. 2 is a perspective view of the housing with the tray in the fully inserted position.
Figure 5:
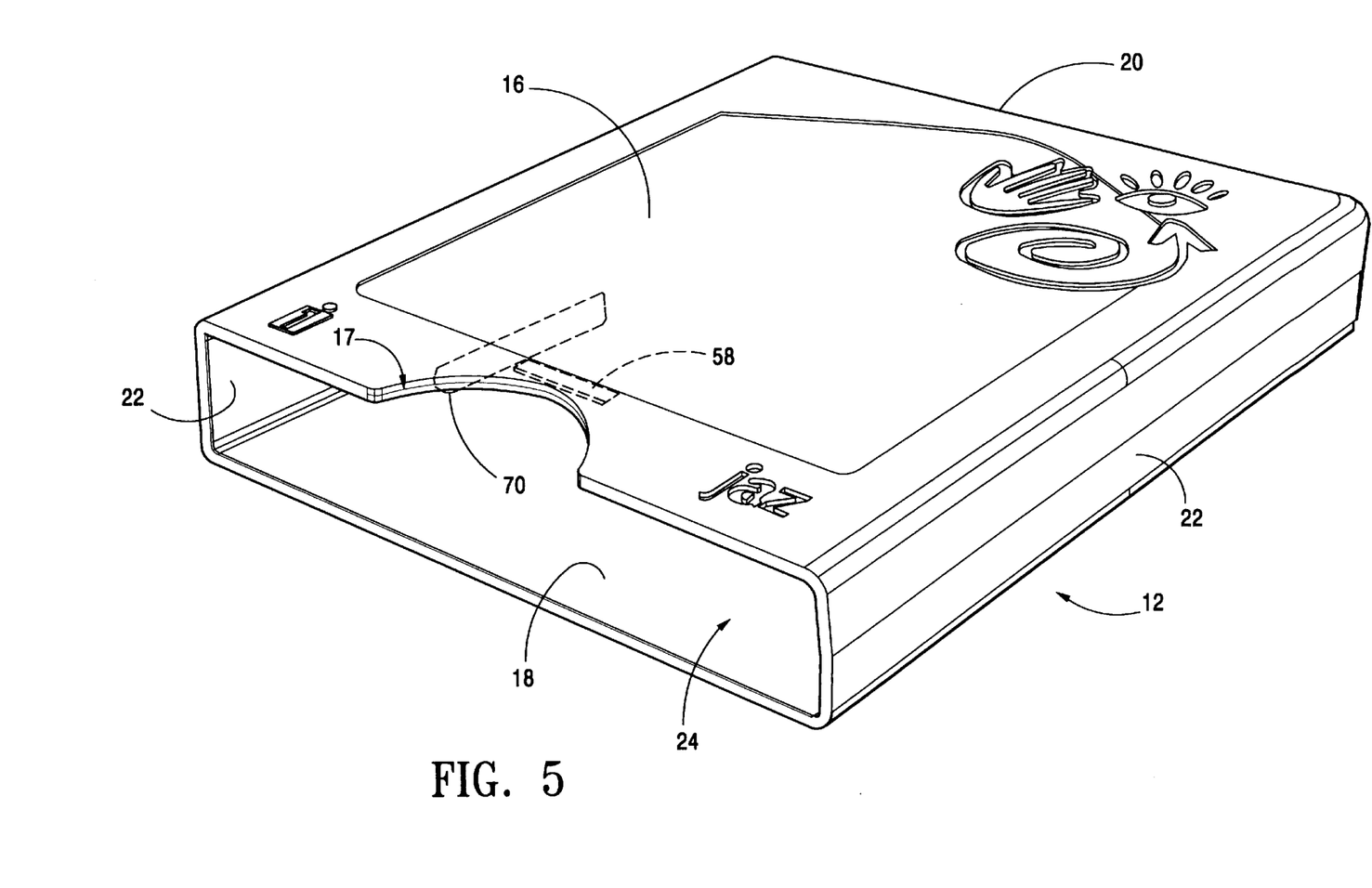
FIG. 5 is a perspective view of the housing.

Referring specifically to FIGS. 1 and 2, a case comprises a housing 12, a tray 14 that is insertable into housing 12, and a seal 13. Referring to FIGS. 1, 2, and 5, housing 12 comprises a planar top member 16, a planar bottom member 18, a rear member 20, two opposing side members 22, and an opening 24. Top member 16 and bottom member 18 form substantially parallel planes. Side members 22 form substantially parallel planes that each join to top member 16 and bottom member 18. Rear member 20 is preferably rectilinear and is attached to each side, top, and bottom members 22, 16, and 18, respectively, to form a box-like shape. On the end opposing rear member 20, housing 12 forms an opening 24. The end having opening 24 will hereinafter be referred to as a cartridge "front" end. Specifically, a front edge of each top member 16, bottom member 18, and side members 22 form opening 24. Because opening 24 receives tray 14 therethrough, opening 24 is preferably substantially rectangular. Top member 16 has a semi-circular cut-out portion 17 that provides access to a grip 46, as will be described more fully below. Cut out portion 17 is proximate opening 24.

Figures 3, 4:
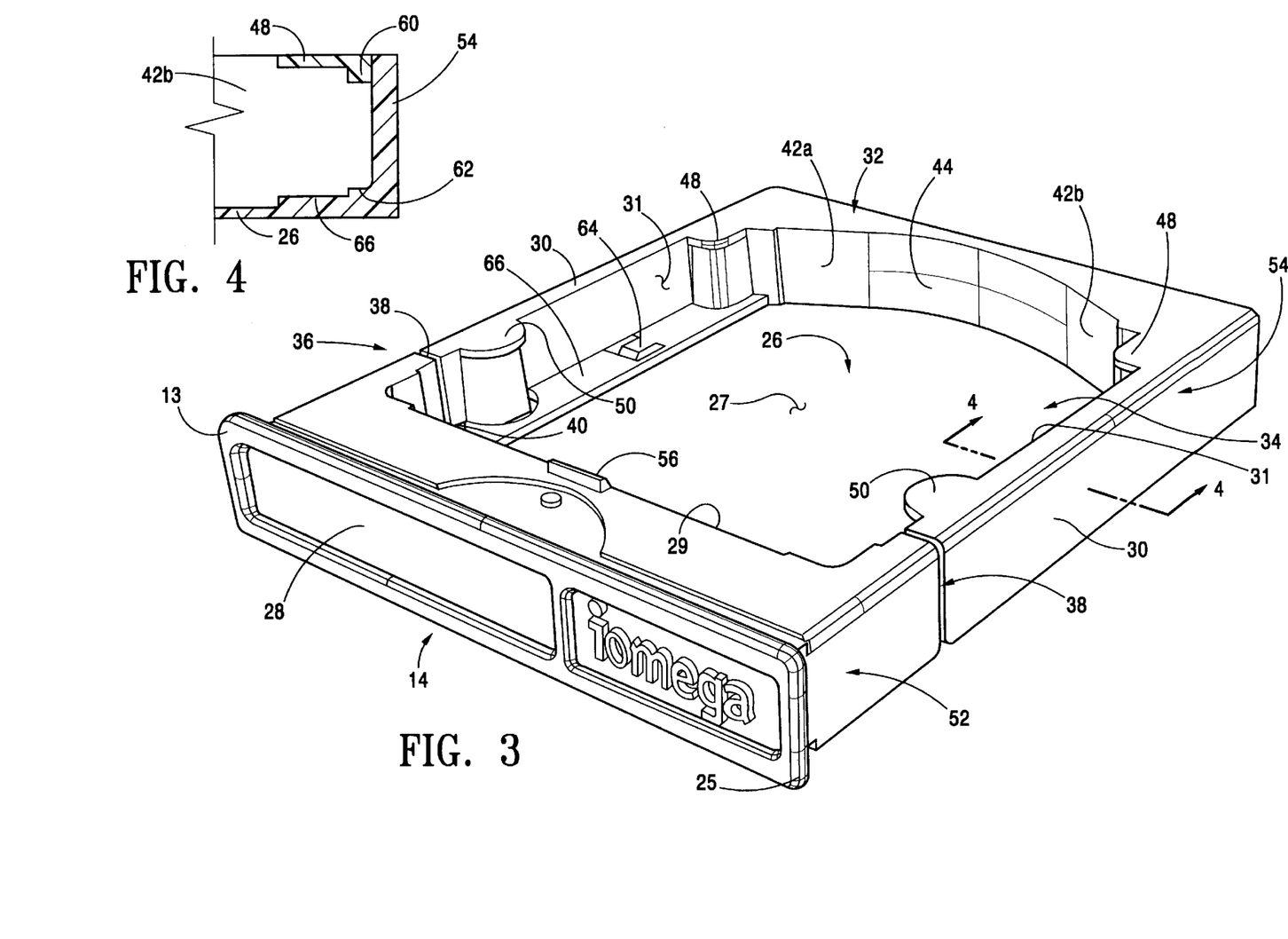
FIG. 3 is a perspective view of the tray removed from the housing and seal.
FIG. 4 is a sectional view of a portion of the tray of FIG. 3.

Referring to FIGS. 1, 2, and 3, tray 14 comprises a bottom planar member 26, a front panel 28, two opposing side walls 30, a rear wall 32, two rear tabs 48, and two front tabs 50. Bottom member 26 is joined to each side wall 30, front panel 28, and rear wall 32. Front panel 28 has a raised lip 25 and a semi-circular serrated grip 46 disposed on top of front panel 28 proximate lip 25. Each side wall 30 is substantially perpendicular to front panel 28, and joined thereto. Rear wall 32 forms an oblique angle where joined to each side wall 30. Rear wall 32 has two rectilinear surfaces, 42a and 42b, which each have one end that is connected to a side wall 30. Rectilinear surfaces 42a and 42b are connected therebetween by an actuate surface 44. Rear tabs 48 are disposed adjacent side walls 30 and rear wall 32. Front tabs 50 are disposed on opposing side walls 30. Each tab 48 and 50 extend from housing walls toward an interior of tray 14.

Bottom planar member 26 has two raised sliding surfaces 66 for slidably receiving cartridge 100. Each of the sliding surfaces 66 has a cantilevered clasp 68 that rides in a groove 70, which is partially shown in FIG. 5, that is disposed on an interior surface of housing bottom member 18. Preferably, housing 14 has two clasps (not shown) disposed on an interior bottom surface of the housing that ride in grooves disposed on the underside (not shown) of sliding surfaces 66.

Front panel 28 has a front panel interior surface 29, each side wall 30 has a side wall interior surface 31, and member 26 has a bottom interior surface 27. Interior wall surfaces 29, 31, 42a,b, and 44, and sliding surfaces 66 form the perimeter boundaries of a receptacle 34 for receiving a magnetic disk cartridge 100 of the type shown in FIG. 7. Bottom member surface 27 and tabs 48 and 50 form the upper and lower boundaries, respectively, of receptacle 34. Preferably, receptacle 34 has dimensions that are slightly larger than the particular magnetic disk cartridge that is received. Receptacle 34 preferably has a width of approximately 3.90625 inches, a height of approximately 0.46875 inches, and an overall length of 4.03125 inches. The overall receptacle length comprises a rectilinear portion of approximately 3.34375 inches, and a curved portion of approximately 0.6875 inches. These receptacle dimensions correspond to dimensions of cartridge 56 plus 0.03125 inches added for clearance.

Referring to FIG. 4, which is a sectional view taken through one side of tray 14, the tray includes a top key member 60 and a bottom key member 62 disposed on one of the side walls 30. Preferably, key members 60, 62 are disposed on corners of the tray so as to protrude into receptacle 34. Top key member 60 is significantly taller than bottom key member 62 so as to mate to corresponding key grooves 102 and 104 on cartridge 100. Top key groove 102 and bottom key groove 104 are shown in FIG. 7.

Each wall 30 has a hinge 36, that is formed therein by slot 38. The portion of wall 30 below slot 38 forms a flex portion 40 that enables a front portion 52 to pivot from a rear portion 54. Preferably, front tabs 50 are located on rear portion 54 near slot 38. When cartridge 56 is positioned within receptacle 34, the plane formed by disk 58 is substantially parallel to a plane formed by bottom member surface 27.

Figure 6:
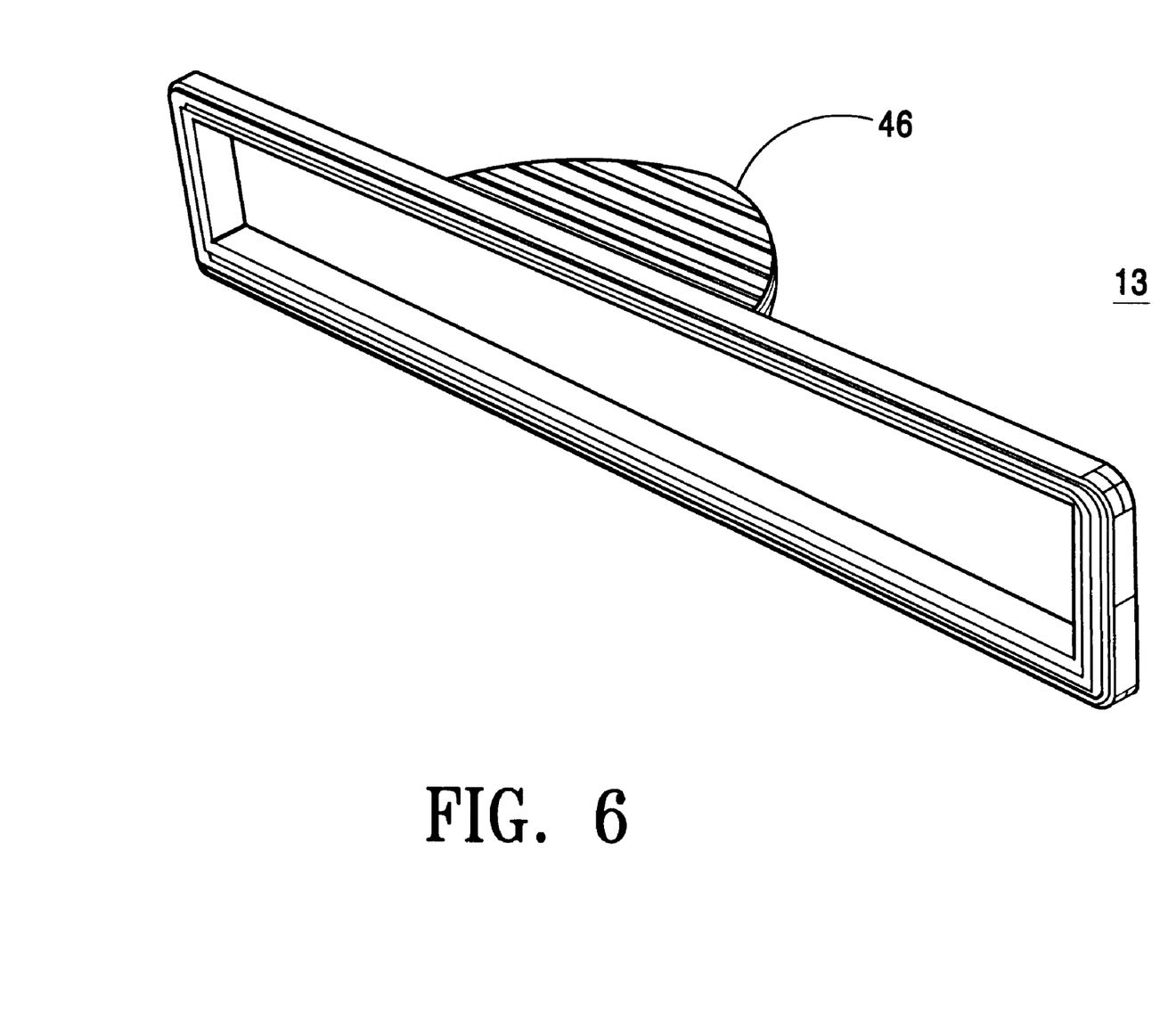
FIG. 6 is a perspective view of the seal.

Referring to FIGS. 1, 2, and 6, seal 13 is preferably located on a front portion of tray 14 immediately to the rear of lip 25. Because seal 13 cooperates with tray 14 and opening 24, seal 13 has approximately the same profile as opening 24. A semi-circular, serrated grip 46 is preferably attached to the rear, top portion of seal 13. Grip 46 mates with cut-out portion 17 while tray 14 is fully inserted into housing 12. Preferably, seal 13 and grip 46 are formed as a single integral piece, as shown in FIG. 6.

The case 10 includes a latching means that includes a latch member 56 disposed on the front portion of tray 14 immediately to the rear of grip 46. Housing 12 has a cavity 58 (shown in relief in FIG. 5) that aligns with latch member 56 when tray 14 is in the fully inserted position.

Preferably, housing 12 is formed from an engineering plastic, for example polystyrene or polypropylene, of sufficient strength to withstand forces commonly encountered by such devices and of sufficient impact resistance to withstand common impacts, such as dropping. Tray 14 is preferably formed from an engineering plastic, for example polystyrene or polypropylene, of sufficient flexibility to permit flex portion 40 and hinge 36 to function as described herein. Seal 13 may be formed of flexible or compressible material, for example rubber, so as to enhance contact between housing 12, seal 13, and tray 14.

Case 10 is preferably employed as retail packaging for a cartridge such that the cartridge may be sold contained in case 10. To operate such a case 10, a user preferably grasps in one hand tray 14 by grip 46 and by lip 25 between a first thumb and forefinger, while simultaneously holding housing 12 in another hand. By squeezing together the first thumb and forefinger, the user depresses the part of the tray that has latch member 56 located thereon. The tray deflects until latch member 56 comes out of cavity 58, thereby enabling tray 14 to be pulled from housing 12. By pulling housing 12 and tray 14 apart, the user may urge tray 14 from housing 12. Tray 14 is translated outward from housing opening 24 until hinge 36 is substantially even with the front edge of opening 24. A short distance after hinge 36 emerges from opening 24, clasp 68 contacts the end of groove 70, thereby preventing further outward travel of tray 14 relative to housing 12. Because hinge 36 is outside of housing 12, the user may pivot tray front portion 52 downward from rear portion 54 via hinge 36, thereby enabling cartridge 56 to clear front panel 28. Cartridge 56 is thus capable of sliding out of tray 14 by manual pulling. Because bottom member surface 27 and tabs 48 and 50 prevent cartridge 56 from pivoting, cartridge 56 is removed from tray 14 by grasping cartridge 56 and pulling thereapart. Tabs 48 and 50 may be formed of flexible material so as to ease removal of cartridge 56 from receptacle 34.

To load cartridge 56 into case 10, tray 14 may be translated outward from housing 12 and pivoted downward as described above. Cartridge 56 may then slide over front panel 28, over bottom member surface 27, beneath front tabs 50 and eventually beneath rear tabs 48. After cartridge 56 clears front panel 28, tray front portion 52 may be pivoted upward until tray 14 is positioned for sliding into housing 12. Sliding members 66, tabs 48 and 50, and corners of the tray are preferably oriented so that only the corners and edges of cartridge 56 are in contact with tray 14.

When tray 14 is fully inserted into housing 12, lip 25 and seal 13 is proximate opening 24. Preferably, lip 25 and seal 13 contact the front edge of top member 16, bottom member 18, and each side member 22, thereby inhibiting dust and chemical contaminants from infiltrating into the case 10 when tray 14 is full inserted therein. A tight fit between seal 13 and housing 12, between grip 46 and cut out 17, and between seal 13 and lip 25 enhance such inhibition to infiltration, especially because wall 28 must be wide enough to support grip 46.

Although certain embodiments of the present invention have been disclosed and described with particularity, these embodiments are provided for the purpose of illustrating the invention and are not meant to be limiting. Upon review of the foregoing specification, those of skill in the art will immediately realize that numerous variations, modifications and adaptations of the invention are possible. Although differing in form and function, such alternate embodiments will employ the spirit of the present invention and are encompassed by the same. Accordingly, reference should be made to the appended claims in order to determine the full scope of the present invention.

What is claimed is:

1. A case for holding a magnetic disk cartridge that houses a disk that defines a disk plane, comprising:

a housing having an opening; and a tray including a substantially planar bottom member and a receptacle capable of receiving a magnetic disk cartridge, said bottom member defining a coincident tray bottom plane, said receptacle having a first rectilinear sidewall, an opposing second rectilinear sidewall, and an arcuate rear wall that are capable of receiving the disk cartridge having a disk plane that is substantially parallel to said tray bottom plane while the cartridge is disposed within the receptacle, said tray being slidably insertable into said opening and being slidably extractable therefrom, said tray being capable of substantially obstructing the opening while said tray is in a fully inserted position;

said tray including a hinge disposed therein and a front panel coupled to the bottom member, said hinge enabling a front portion of said tray to pivot relative to a rear portion of said tray, said front panel capable of substantially obstructing the housing opening while the tray is in the fully inserted position.

2. The case of claim 1 further comprising a seal disposed on the tray proximate the opening while the tray is in the fully inserted position.

3. The case of claim 1 wherein the tray has a front panel coupled to the bottom member, said front panel capable of substantially obstructing the housing opening while the tray is in the fully inserted position.

4. The case of claim 3 further comprising a seal that is disposed between the front panel of the tray and a front edge of the housing while the tray is in the fully inserted position, the seal capable of inhibiting contaminants from passing therethrough.

5. The case of claim 3 wherein the receptacle further includes, each one of said two side walls and said rear wall being coupled to said tray bottom member, each one of said two side walls having an end coupled to said front face and an other end coupled to said rear wall, said bottom member forming a bottom surface, each one of said two side walls forming a side surface, said rear wall forming a rear surface; said bottom surface, said two side surfaces, and said rear surface defining at least a part of the receptacle.

6. The case of claim 5 wherein said rear wall forms a first rectilinear surface that obliquely extends from a back end of one of the rear surfaces, a second rectilinear surface that obliquely extends from a back end of an other one of the rear surfaces, and an arcuate surface coupled between said first rectilinear surface and said second rectilinear surface.

7. The case of claim 1 wherein said tray includes a gripping surface disposed thereon capable of facilitating gripping of said tray during insertion and extraction of said tray from said housing.

8. The case of claim 1 wherein said receptacle receives a cartridge having a width that is approximately 3.875 inches, a height that is approximately 0.4375 inches, and an overall length of approximately 4.0 inches, said overall length comprising a first rectilinear portion that is approximately 3.3125 inches.

9. The case of claim 6 wherein said receptacle has a width that is approximately 3.90625 inches, a height that is approximately 0.46875 inches, and an overall length of approximately 4.03125 inches, said overall length comprising a first rectilinear portion that is approximately 3.34375 inches; whereby said receptacle has a shape that substantially corresponds to the cartridge shape plus a clearance to enable the receptacle to hold the cartridge without rattling.

10. The case of claim 1 wherein the tray includes multiple tabs disposed proximate an upper portion of the tray, the multiple tabs defining an upper boundary of at least part of the receptacle.

11. The case of claim 1 wherein said tray includes:

two rear tabs disposed on an upper portion of the tray, a first one of said two rear tabs coupled to a rear wall and the first side wall, a second one of said two rear tabs coupled to the rear wall and the second side wall;

two front tabs disposed proximate an upper portion of the tray, a first one of said two front tabs coupled to the first sidewall, a second one of said two front tabs coupled to the second sidewall, said front tabs disposed on the tray rear portion proximate the hinge;

a first planar sliding member raised above the tray bottom plane and disposed directly below the first rear tab and the first front tab, a second planar sliding member raised above the tray bottom plane and disposed directly below the second rear tab and the second front tab;

the tabs adapted such that the cartridge top contacts only the tabs while the cartridge is inside the case, the sliding members adapted such that the cartridge bottom contacts only the sliding members while the cartridge is inside the case.

12. The case of claim 10 wherein the bottom member, the rear tabs, and the front tabs form at least part of the receptacle therebetween.

13. The case of claim 1 further comprising a latch member protruding from the housing for latching the tray to the housing while the tray is in the fully inserted position.

14. The case of claim 1 further comprising:

a first key member disposed on an upper corner of the tray and protruding into the receptacle from a first sidewall of the tray, the first key member being capable of slidable insertion into a corresponding uniform key groove that is formed on substantially the entire length of the disk cartridge; and a second key member disposed on an lower corner of the tray and protruding into the receptacle from the first sidewall of the tray, the first key member disposed directly above the second key member, the second key member having a cross sectional profile that is substantially different from a cross sectional profile of the first key member and being capable of slidable insertion into another corresponding uniform key groove that is formed on substantially the entire length of the disk cartridge, the key members adapted to assure proper orientation of the cartridge during insertion into the tray.

15. The case of claim 1 wherein the housing includes a top planar member having a substantially transparent panel disposed therein that is capable of enabling at least a portion of the disk cartridge to be seen from the exterior of the case while the cartridge is disposed within the case and the tray is in the fully inserted position.

16. The case of claim 13 wherein the tray comprises a cavity disposed therein, said cavity receiving the latch member to latch the tray with the housing while the tray is in the fully inserted position, the latch member being depressable to unlatch said tray from said housing.

17. The case of claim 14 wherein the first key member is taller than the second key member.

18. A case for holding a disc cartridge comprising:
a housing;
a tray forming a receptacle therein for slidably receiving the disc cartridge, the tray insertable into the housing; and
a first key member and a second key member that are disposed on the same side of the tray and project therefrom into the receptacle, the first key member capable of slidable insertion into a corresponding uniform key groove disposed on the cartridge, the second key member capable of slidable insertion into another corresponding uniform key groove disposed on the cartridge, the first key groove having a cross sectional profile substantially different from a cross sectional profile of the second key member, the first key member disposed directly above the second key member, the key members adapted to assure proper orientation of the cartridge during insertion into the tray.

* * * * *

UNITED STATES PATENT AND TRADEMARK OFFICE
CERTIFICATE OF CORRECTION

PATENT NO. : 5,944,182
DATED : August 31, 1999
INVENTOR(S) : Kristi Williams and Shaun Salisbury It is certified that error appears in the above-identified patent and that said Letters Patent is hereby corrected as shown below:

Col. 4, line 17, change "56" to -57-
Col. 4, line 19, change "56" to -57-
Col. 4, line 39, change "56" to -57-
Col. 4, line 40, change "56" to -57-

On the title page, in the illustrative figure, change "56" to --57--.
In the Drawings Figs. 1 and 3 change character "56" to -57-.

Signed and Sealed this

Eighteenth Day of July, 2000

*Attest:*

Q. TODD DICKINSON

*Attesting Officer*  *Director of Patents and Trademarks*